(12) United States Patent
Maeda et al.

(10) Patent No.: US 10,810,703 B2
(45) Date of Patent: Oct. 20, 2020

(54) DISPLAY DEVICE

(71) Applicant: Yazaki Corporation, Tokyo (JP)

(72) Inventors: Tomohiro Maeda, Shizuoka (JP); Masakatsu Suyama, Shizuoka (JP); Takayuki Ono, Shimada (JP); Kaori Kobayashi, Shimada (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/729,856

(22) Filed: Oct. 11, 2017

(65) Prior Publication Data
US 2018/0108117 A1    Apr. 19, 2018

(30) Foreign Application Priority Data
Oct. 14, 2016    (JP) .................................. 2016-202334

(51) Int. Cl.
| | |
|---|---|
| *G06T 3/60* | (2006.01) |
| *G06T 5/00* | (2006.01) |
| *B60K 37/02* | (2006.01) |
| *B60K 35/00* | (2006.01) |
| *G06T 11/20* | (2006.01) |
| *G06T 13/80* | (2011.01) |

(52) U.S. Cl.
CPC ............... *G06T 3/60* (2013.01); *B60K 35/00* (2013.01); *B60K 37/02* (2013.01); *G06T 5/002* (2013.01); *G06T 11/20* (2013.01); *G06T 11/206* (2013.01); *G06T 13/80* (2013.01); *B60K 2370/154* (2019.05); *B60K 2370/52* (2019.05); *G06T 2207/30268* (2013.01)

(58) Field of Classification Search
CPC ........................................................ G06T 3/60
USPC .......................................................... 345/656
See application file for complete search history.

(56) References Cited

U.S. PATENT DOCUMENTS

| | | | |
|---|---|---|---|
| 8,339,400 B2 * | 12/2012 | Katoh | B60K 35/00 345/440.2 |
| 9,569,867 B2 * | 2/2017 | Stevens | G06T 11/206 |
| 2007/0296724 A1 * | 12/2007 | Katoh | B60K 35/00 345/475 |

(Continued)

FOREIGN PATENT DOCUMENTS

| | | |
|---|---|---|
| JP | 2003137007 A | 5/2003 |
| JP | 20088637 A | 1/2008 |
| JP | 2009-103473 A | 5/2009 |

OTHER PUBLICATIONS

Communication dated Oct. 30, 2018, from the Japanese Patent Office in counterpart application No. 2016-202334.

*Primary Examiner* — Javid A Amini
(74) *Attorney, Agent, or Firm* — Sughrue Mion, PLLC

(57) ABSTRACT

A display device includes a display section configured to display images, and a controller configured to control the display section to display an indicator-needle motion-blurred image from an entire indicator-needle motion-blurred image that is an image previously stored in a storage unit and represents an afterimage corresponding to an entire rotation range within which an indicator needle is capable of rotating, the indicator-needle motion-blurred image representing an afterimage of the indicator needle that corresponds to a rotation range within which the indicator needle rotates per unit time when rotated. Consequently, the display device is effective at enabling the indicator needle to be appropriately displayed.

6 Claims, 6 Drawing Sheets

(56) References Cited

U.S. PATENT DOCUMENTS

| | | | |
|---|---|---|---|
| 2009/0102787 A1* | 4/2009 | Okumura | B60K 35/00 |
| | | | 345/157 |
| 2010/0026827 A1* | 2/2010 | Kobayashi | H04N 5/235 |
| | | | 348/222.1 |
| 2018/0108117 A1* | 4/2018 | Maeda | B60K 37/02 |
| 2018/0215266 A1* | 8/2018 | Shoji | B60K 35/00 |

* cited by examiner

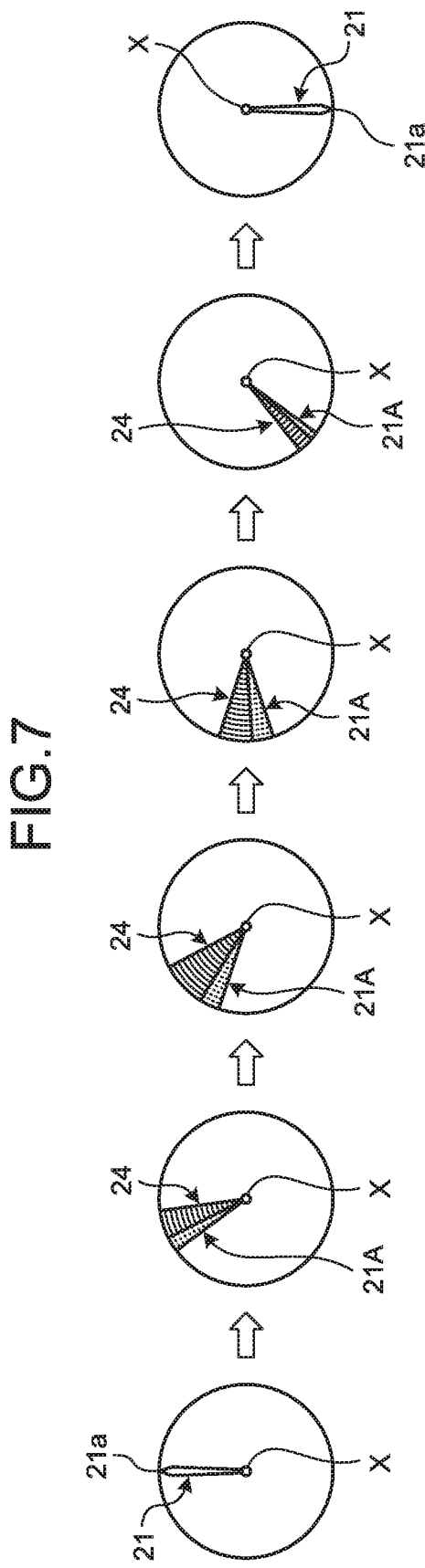

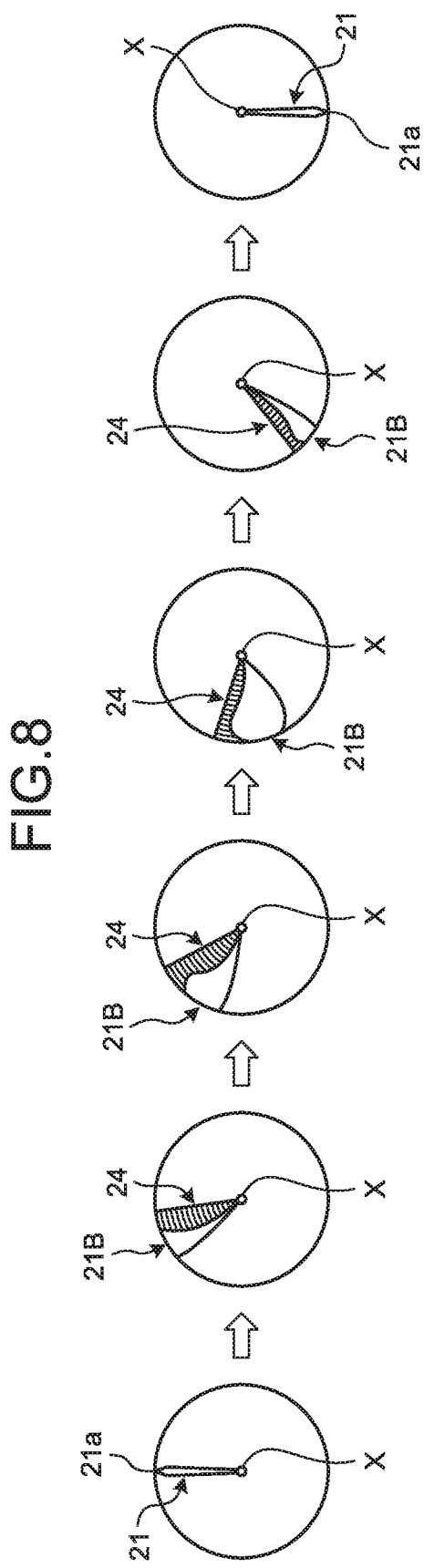

DISPLAY DEVICE

CROSS-REFERENCE TO RELATED APPLICATION(S)

The present application claims priority to and incorporates by reference the entire contents of Japanese Patent Application No. 2016-202334 filed in Japan on Oct. 14, 2016.

BACKGROUND OF THE INVENTION

1. Field of the Invention

The present invention relates to a display device.

2. Description of the Related Art

As conventional display devices applied to vehicles include, for example, a display device disclosed in Japanese Patent Application Laid-open No. 2009-103473 includes a display panel on which an indicator needle image representing an indicator needle and an track image representing a track of movement of the indicator needle image can be displayed, and a controller configured to control a display status of the display panel so that indicator needle images can be sequentially switched from one to the next, and track images can also be sequentially switched from one to the next, for a plurality of frames.

However, the above-described display device disclosed in Japanese Patent Application Laid-open No. 2009-103473 has room for further improvement, for example, in that the indicator needle is to be displayed more appropriately.

SUMMARY OF THE INVENTION

The present invention has been made in consideration of the above situations, and an object thereof is to provide a display device capable of appropriately displaying an indicator needle.

In order to achieve the above mentioned object, a display device according to one aspect of the present invention includes a display section configured to display an image, and a controller configured to control the display section to display an indicator-needle motion-blurred image from an entire indicator-needle motion-blurred image that is an image previously stored in a storage unit and represents an afterimage corresponding to an entire rotation range within which an indicator needle is capable of rotating, the indicator-needle motion-blurred image representing an afterimage of the indicator needle that corresponds to a rotation range within which the indicator needle rotates per unit time when rotated.

According to another aspect of the present invention, in the display device, the controller may control the display section to display an indicator needle image at a forward end of the indicator-needle motion-blurred image in a direction of rotating of the indicator needle, the indicator needle image representing the indicator needle.

According to still another aspect of the present invention, in the display device, the controller may control the display section to display the indicator-needle motion-blurred image and the indicator needle image in a manner such that, as a rotation amount per the unit time that the indicator needle is assumed to reach when rotated increases, a length of the indicator-needle motion-blurred image along a tip end of the indicator needle in the direction of the rotation opposite to the center of the rotation and a length of the indicator needle image along the tip end of the indicator needle in the direction of the rotation opposite to the center of the rotation are longer.

The above and other objects, features, advantages and technical and industrial significance of this invention will be better understood by reading the following detailed description of presently preferred embodiment(s) of the invention, when considered in connection with the accompanying drawings.

BRIEF DESCRIPTION OF THE DRAWINGS

FIG. 7 is a schematic diagram sequentially illustrating examples of displaying an indicator needle on a display device according to a second embodiment; and FIG. 8 is a schematic diagram sequentially illustrating examples of displaying an indicator needle on a display device according to a modification.

DETAILED DESCRIPTION OF THE PREFERRED EMBODIMENTS

The following describes some embodiments according to the present invention in detail with reference to the accompanying drawings. These embodiments are not intended to limit the invention. Components included in the following embodiments may include a component that the skilled person can easily replace with a different component, and may include components which are substantially the same as each other.

First Embodiment

Figure 1:
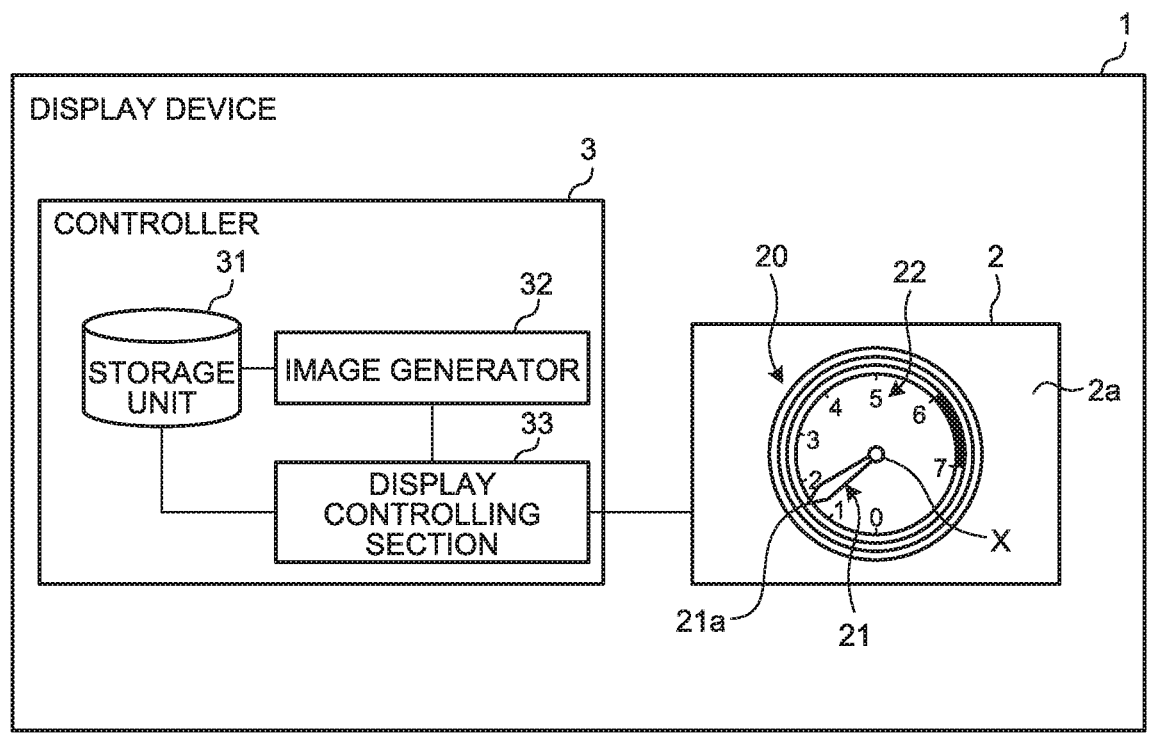
FIG. 1 is a block diagram illustrating a schematic configuration of a display device according to a first embodiment.

A display device 1 according to the first embodiment shown in FIG. 1 is employed, for example, for a vehicle, and is included as a component in an in-vehicle meter employed for the vehicle. The display device 1 is mounted on, for example, an instrument panel installed in a dashboard of the vehicle, and displays thereon various kinds of vehicle information that serve for driving of the vehicle.

Specifically, the display device 1 includes a display section 2 and a controller 3 as illustrated in FIG. 1.

The display section 2 is a device intended to be mounted on a vehicle and display an image on an image display surface 2a. The display section 2 can be constructed using, for example, a liquid crystal display (liquid crystal panel) that employs thin film transistors (TFTs), but is not limited to this example, and can alternatively be constructed using a display such as a plasma display or an organic electroluminescence (EL) display. The display section 2 in this embodiment displays at least one indicator needle that rotates about an axial line X, and a meter image 20 representing various different measured values about the vehicle with gauge sections, such as a scale, on each of which the indicator needle points to a value. The meter image 20 is an image representing at least one among various meters such as a speedometer that indicates a vehicle speed of the vehicle on which the display device 1 is mounted, a tachometer that indicates the number of output revolutions of a power source for running the vehicle, a fuel meter that indicates the remaining amount of fuel, and a water temperature mater that indicates the temperature of cooling water. FIG. 1 illustrates, as an example, an image that represents a tachometer. The meter image 20 includes an indicator needle image 21 representing an indicator needle that rotates about the axial line X, and a gauge-section image 22 representing a gauge section on which the indicator needle image 21 points to a value. The meter image 20 indicates various different measured values about the vehicle with the indicator needles, which are represented by the respective indicator needle images 21, pointing to certain positions on the respective gauge sections represented by the gauge section images 22. At the same time as indicating the measured values, the display section 2 may display images about vehicle information on the vehicle such as, images about various kinds of information that change momentarily, such as the speed of the vehicle, the accumulated traveled distance, the temperature of cooling water, the number of output revolutions of the power source for running the vehicle, the remaining amount of fuel, the amount of power stored in the battery, navigation information, map information, and information on intersections, and images, such as various patterns, signs, and character strings, according to vehicle information indicated by, for example, various warning lamps (so called telltales), a shift position indicator, and a direction indication sign.

The controller 3 is configured to control the display section 2 and thereby controls display that the display section 2 performs. Typically, the controller 3 controls one or more images that the display section 2 displays. The controller 3 may be constructed of, for example, an electronic control unit (ECU) that centrally controls individual units of the vehicle and that doubles as the controller 3. Alternatively, the controller 3 may be constructed separately from the ECU and configured to exchange information in the form of detection signals, drive signals, control commands, and the like with the ECU. The controller 3 includes an electronic circuit the main part of which is a known microcomputer that includes a central processing unit (CPU), a read-only memory (ROM), random access memory (RAM), and an interface. Various electrical components, such as sensors and detectors and that detect states of the vehicle are electrically coupled to the controller 3, so that electric signals according to detection results are input therein. The controller 3 is electrically coupled to the display section 2 and outputs drive signals to the display section 2. The controller 3 executes a control program stored in, for example, the ROM or the RAM based on various input signals input from the various electrical components such as sensors and detectors, to output drive signals to the display section 2, thus executing various kinds of processing that control images that the display section 2 displays.

The controller 3 is capable of executing, for example, processing that enables the meter image 20 to indicate a measured value (in this case, the number of output revolutions of the power source for running the vehicle) about the vehicle. The controller 3 sequentially updates image frames (corresponding to respective still images that serve as units constituting a video) at certain timings, thereby displaying the indicator needle on the image display surface 2a of the display section 2 in a manner such that the indicator needle rotates. As illustrated in FIG. 1 to FIG. 4, when displaying various measured values about the vehicle indicated by the meter image 20, the controller 3 in this embodiment implements displaying the indicator needle in a manner improved in appropriateness. This implementation can be achieved by statically displaying the gauge-section image 22 with the gauge-section image 22 held unmoving and dynamically displaying indicator-needle motion-blurred images 23 (see FIG. 3) generated based on an entire indicator-needle motion-blurred image 24 (see FIG. 4) and representing afterimages of the indicator needle represented by the indicator needle image 21. The controller 3 generates the indicator-needle motion-blurred images 24 based on the entire indicator-needle motion-blurred image 23 with respect to each of each a plurality of frames each set so as to correspond to a unit time, and controls the controller 3 so that processing can be executed in which to cause the display section 2 to display the generated indicator-needle motion-blurred images 24 while sequentially switching these images from one to the next. Thus, the indicator needle is displayed on the image display surface 2a while being rotated. The controller 3, in one example, functionally conceptually includes a storage unit 31, an image generator 32, and a display controlling section 33 as illustrated in FIG. 1. The storage unit 31, the image generator 32, and the display controlling section 33 are capable of exchanging various kinds of information with various devices that are electrically coupled to the unit, the generator and the section.

Figure 2:
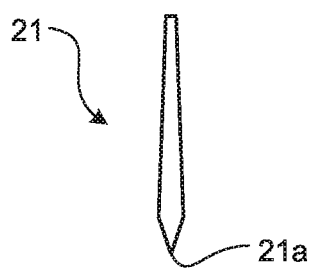
FIG. 2 is a schematic diagram illustrating an example of an indicator needle image on the display device according to the first embodiment.
Figure 3:
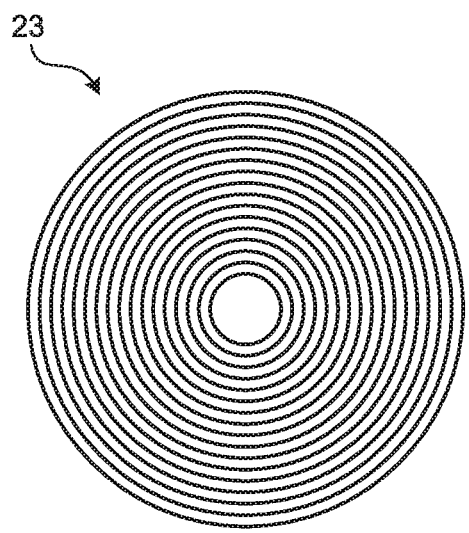
FIG. 3 is a schematic diagram illustrating an example of an entire indicator-needle motion-blurred image displayed on the display device according to the first embodiment.

The storage unit 31 is a storage device such as a memory and has conditions and data that are needed for various kinds of processing to be performed by the controller 3, and various computer programs that are executed by the controller 3, stored therein. The storage unit 31 also has image data stored therein that represents one or more images to be displayed by the display section 2. The storage unit 31 in this embodiment has image data as data that constructs the above-described meter image 20, the image data including the indicator needle image 21 illustrated in FIG. 1 and FIG. 2, the gauge section image 22 illustrated in FIG. 1, and the entire indicator-needle motion-blurred image 23 illustrated in FIG. 3. As illustrated in FIG. 1 and FIG. 2, the indicator needle image 21 is an image that is previously stored in the storage unit 31 and is an image representing a rotative indicator needle that is displayed in such a manner as to rotate about the axial line X. The indicator needle image 21 illustrated in FIG. 1 and FIG. 2 is an image formed so as to, in an unmoving state, have a tapered needle-like shape at one side, that is, the side having a tip end 21a, opposite to the side having its rotation center (the axial line X). As illustrated in FIG. 1, the gauge section image 22 is an image previously stored in the storage unit 31, and is an image having components such as an arc drawn along the locus of rotation of the tip end 21a of the indicator needle image 21, a plurality of scale marks provided at uniform intervals along the arc, and digits. As illustrated in FIG. 3, the entire indicator-needle motion-blurred image 23 is an image previously stored in the storage unit 31, and is an image representing an afterimage corresponding to the entire rotation range within which the indicator needle represented by the indicator needle image 21 is capable of rotating. The entire indicator-needle motion-blurred image 23 herein is formed as an image having a shape of a substantially perfect circle in a range corresponding to a rotation angle (an angle about the rotation center (the axial line X)) of 360 degrees. The entire indicator-needle motion-blurred image 23 illustrated in FIG. 3 schematically depicts, as an afterimage composed of concentric circles, an afterimage that appears when the indicator needle represented by the indicator needle image 21 rotates. However, the entire indicator-needle motion-blurred image 23 may be determined as appropriate in accordance with the design of the indicator needle represented by the indicator needle image 21, and may be gradationally shaded in accordance with the design of the indicator needle.

The image generator 32 is configured to generate display image data that is image data to be displayed on the display section 2. The image generator 32 generates the display image data based on image data stored in the storage unit 31. The image generator 32 reads out image data from the storage unit 31 and generates display image data that the display section 2 is caused to display eventually. The image generator 32, for example, sequentially generates display image data for respective frames in certain control cycles.

The display controlling section 33 is configured to control the display section 2 to control one or more images to be displayed by the display section 2. The display controlling section 33 in this embodiment controls the display section 2 based on image data generated by the image generator 32 so that the display section 2 can dynamically display images such as one related to the indicator needle.

Figure 4:
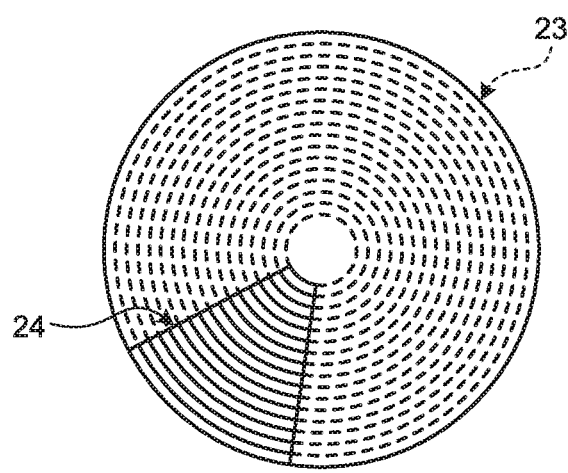
FIG. 4 is a schematic diagram illustrating an example of an indicator-needle motion-blurred image displayed on the display device according to the first embodiment.

As illustrated in FIG. 4, from the entire indicator-needle motion-blurred image 23 stored in the storage unit 31, the image generator 32 in this embodiment generates the indicator-needle motion-blurred image 24 that represents an afterimage of the indicator needle, the afterimage corresponding to a rotation range within which the indicator needle rotates per unit time when rotated. The display controlling section 33 then displays the indicator-needle motion-blurred image 24 thus generated by the image generator 32. The unit time herein means any period of time that is previously determined, and typically is a period of time corresponding to each control cycle. That is, from the entire indicator-needle motion-blurred image 23, the image generator 32 sequentially generates the indicator-needle motion-blurred images 24 that each correspond to the rotation range per certain control cycle (unit time), with respect to each plurality of frames set so as to correspond to the certain control cycles (unit times). The display controlling section 33 controls the display section 2 to sequentially switch, from one to the next, the indicator-needle motion-blurred images 24 generated by the image generator 32 with respect to the plurality of frames and thereby display the individual indicator-needle motion-blurred images 24 by the display section 2.

A rotation range of the indicator needle per unit time corresponds to a range within which the indicator needle rotates in each frame during each of the certain control cycles. When the indicator needle is assumed to have a higher rotation speed, that is, as the indicator needle rotates more per unit time, the rotation range is larger. The indicator-needle motion-blurred image 24 is generated, depending on the rotation range per unit time, as a substantially sectorial image that has its center at the axial line X assumed to be the rotation center of the indicator needle represented by the indicator needle image 21. More specifically, as an assumed rotation speed per unit time of the indicator needle increases, the indicator-needle motion-blurred image 24 is generated as a substantially sectorial image that is wider and longer in length (length of an arch portion on the side opposite to the axial line X) in the direction of the rotation.

For example, based on measured values (the number of output revolution in this case) to be indicated by the meter image 20 that have been sampled by various electrical components such as sensors and detectors during each unit time (control cycle) and have been input from higher-level equipment such as the ECU, the image generator 32 calculates a start point position, an end point position, and a rotation amount per unit time of rotation of the indicator needle represented by the indicator needle image 21 in a frame corresponding to the unit time. In accordance with a rotation range per unit time determined based on the calculation results, the image generator 32 generates the indicator-needle motion-blurred image 24 from the entire indicator-needle motion-blurred image 23. As illustrated in FIG. 4, the image generator 32 in this embodiment generates the indicator-needle motion-blurred image 24 with respect to each frame by cutting out a range from the entire indicator-needle motion-blurred image 23 stored in the storage unit 31, the range corresponding to the rotation range per unit time. The display controlling section 33 then controls the display section 2 to sequentially switch, from one to the next, the indicator-needle motion-blurred images 24 corresponding to the respective ranges thus cut out by the image generator 32 so as to display one of the individual indicator-needle motion-blurred images 24 at a time by the display section 2, thus displaying ranges of the entire indicator-needle motion-blurred image 23 while changing the ranges on a frame-to-frame basis, the range needing to be displayed as the indicator-needle motion-blurred image 24. Alternatively, the image generator 32 may generate an image having a mask image superimposed on the entire indicator-needle motion-blurred image 23 stored in the storage unit 31, and generate an image including the indicator-needle motion-blurred image 24 by removing, with respect to each frame, a range of the mask image that corresponds to the rotation range per unit time. Here, the mask image has been colored with a background color (for example, black) of the meter image 20. The display controlling section 33 then controls the display section 2 to sequentially switch, from one to the next, the respective images thus generated with respect to the individual frames by the image generator 32 so as to display one of the images at a time by the display section 2, thus displaying a range while changing the range on a frame-to-frame basis, the range having the indicator-needle motion-blurred image 24 exposed from the entire indicator-needle motion-blurred image 23 via a hided range of the mask image.

Figure 5:
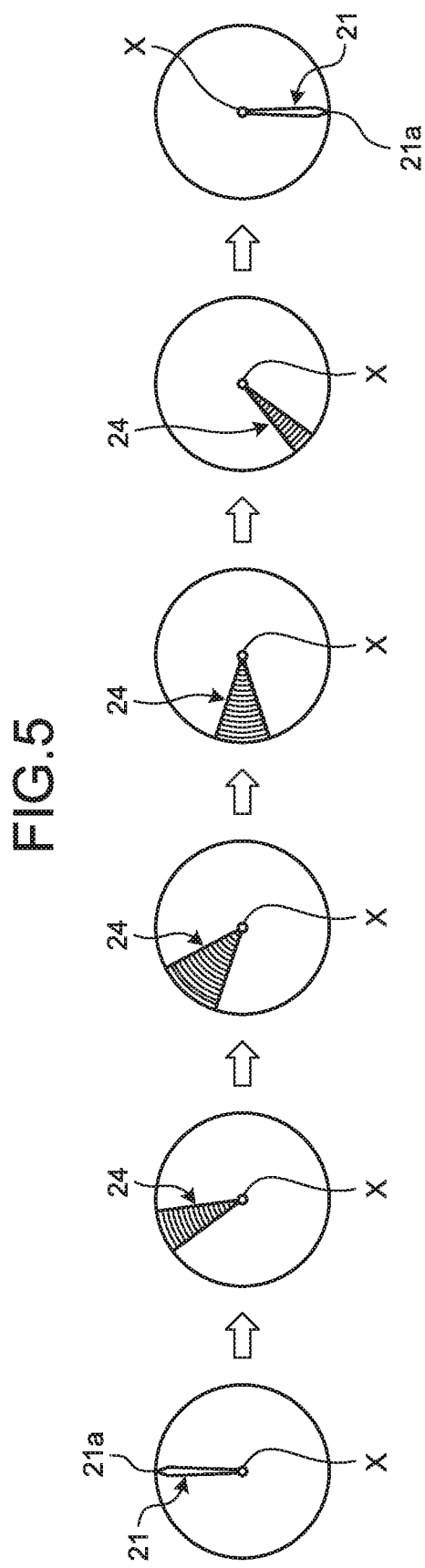
FIG. 5 is a schematic diagram sequentially illustrating examples of displaying an indicator needle on the display device according to the first embodiment.

As illustrated in FIG. 1 and FIG. 5, when the indicator needle is at a start point position or an end point position at which the indicator needle is unmoving, the image generator 32 in this embodiment generates, based on image data stored in the storage unit 31, the gauge section image 22 and the indicator needle image 21 as display image data. Based on these images, the display controlling section 33 causes the display section 2 to display the gauge section image 22 and the indicator needle image 21 in respective unmoving states. In contrast, when the indicator needle is in a transitioning state where it is being rotated from a start point position to an end point position, the image generator 32 hides the indicator needle image 21 and generates, as display image data for each frame, the gauge section image 22 and the indicator-needle motion-blurred image 24 that corresponds to the rotation range per unit time from the entire indicator-needle motion-blurred image 23. Based on these images, the display controlling section 33 causes the display section 2 to dynamically display the indicator-needle motion-blurred images 24 across a plurality of frames while causing the display section 2 to display the gauge section image 22 in an unmoving state. That is, when the indicator needle is in a transitioning state where it is being rotated from a start point position to an end point position, the image generator 32 and the display controlling section 33 in this case express the movement of the indicator needle using the indicator-needle motion-blurred images 24, which represent afterimages of the indicator needle, instead of the indicator needle image 21 itself. In the example of FIG. 5, the start point position is a position at which the tip end 21a of the indicator needle image 21 representing the indicator needle faces upward in the figure, and the end point position is a position at which the tip end 21a of the indicator image 21 representing the indicator needle faces downward in the figure after rotating 180 degrees counterclockwise (to the left) about the axial line X from the start point position. It is assumed that the rotation amount per unit time (i.e., the rotation speed) of the indicator needle gradually increases starting from the start point position, is the largest at the intermediate position in the course of rotation of the indicator needle from the start point position to the end point position, and gradually decreases toward the end point portion. In accordance with this assumption, the lengths in the rotation direction (lengths of the arch portions on the sides opposite to the axial line X) of the indicator-needle motion-blurred images 24 are gradually longer starting from the start point position and are gradually shorter toward the end point position with the longest one found at the intermediate position in the course of rotation of the indicator needle from the start point position to the end point position.

Figure 6:
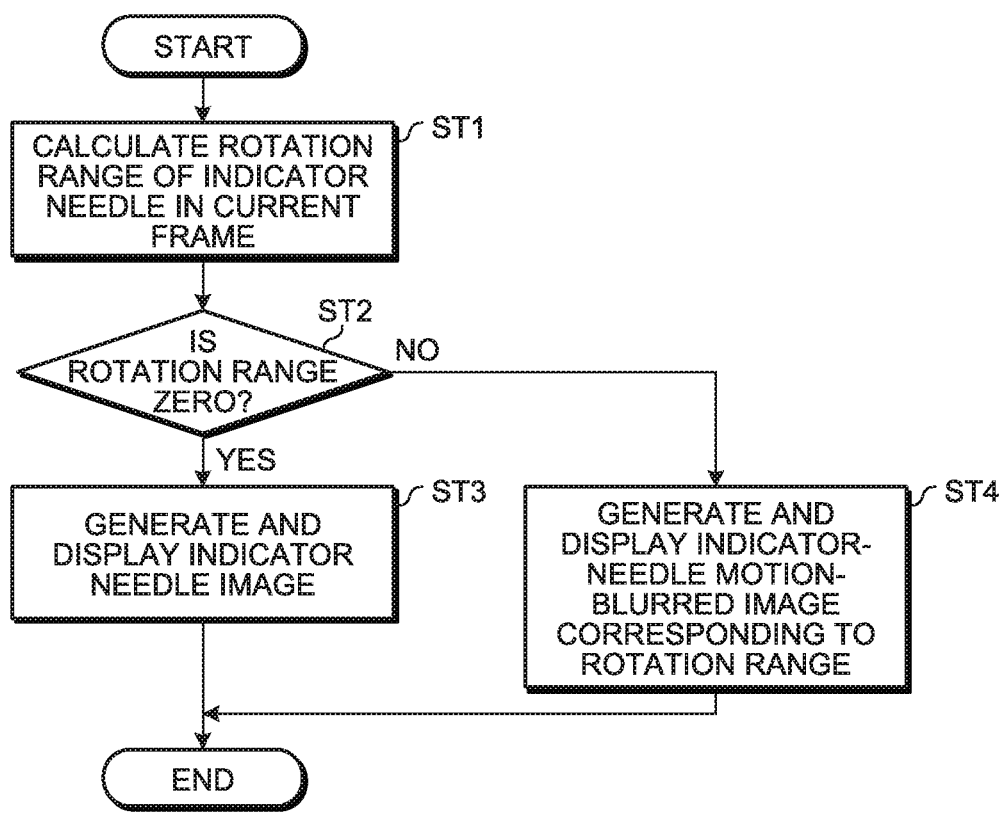
FIG. 6 is a flowchart illustrating an example of display control to be performed by the display device according to the first embodiment.

An example of display control to be performed by the controller 3 on the display section 2 is described next with reference to the flowchart in FIG. 6. Each of these control routines is repeatedly executed in control cycles (clock units) of several to several ten milliseconds, in other words, is repeatedly executed frame by frame.

First, based on measured values that have been sampled by various components of equipment such as sensors and detectors and have been input from higher-level equipment such as the ECU, the image generator 32 in the controller 3 calculates a start point position, an end point position, and a rotation amount per unit time for rotation of the indicator needle represented by the indicator needle image 21 in each frame per unit time, and calculates a rotation range per unit time of the indicator needle determined based on results of the foregoing calculation (Step ST1).

The image generator 32 then determines whether the rotation range per unit time of the indicator needle calculated in Step ST1 is zero (Step ST2).

If having determined that the rotation range per unit time of the indicator needle is zero (Yes in Step ST2), that is, if having determined that the indicator needle is unmoving, the image generator 32 generates the gauge section image 22 and the indicator needle image 21, as display image data, based on image data stored in the storage unit 31. The display controlling section 33 in the controller 3 then removes the indicator needle image 21 or indicator-needle motion-blurred image 24 that has been displayed in the previous control cycle, and causes the display section 2 to display the gauge section image 22 and the indicator needle image 21 in respective unmoving states based on the gauge section image 22 and the indicator needle image 21 that have been generated by the image generator 32 (Step ST3), thereby ending the current control cycle and proceeding to the next control period.

If having determined that the rotation range per unit time of the indicator needle is not zero (No in Step ST2), that is, if having determined that the indicator needle is in the transitioning state where it is being rotated from a start point position to an end point position, the image generator 32 generates, as display image data, the gauge section image 22 and the indicator-needle motion-blurred image 24 that corresponds to a rotation range per unit time from the entire indicator-needle motion-blurred image 23, based on image data stored in the storage unit 31. The display controlling section 33 then deletes the indicator needle image 21 or indicator-needle motion-blurred image 24 that has been displayed in the previous control cycle, and causes the display section 2 to display the gauge section image 22 in an unmoving state based on the gauge section image 22 and the entire indicator-needle motion-blurred image 23 that have been generated by the image generator 32, and, at the same time, causes the display section 2 to display the indicator-needle motion-blurred image 24 (Step ST4), thereby ending the current control cycle and proceeding to the next control period.

The display device 1 described hereinabove enables the controller 3 to control the display section 2 to display, from the entire indicator-needle motion-blurred image 23 stored in the storage unit 31, the indicator-needle motion-blurred image 24 that represents an afterimage of the indicator needle, the afterimage corresponding to a rotation range within which the indicator needle rotates per unit time when rotated. Thus, unlike a case in which images representing afterimages of the indicator needle are generated individually corresponding to respective rotation ranges in unit times, for example, the display device 1 can minimize the amount of calculation and a computational load, and additionally can dynamically represent the movement of the indicator needle while providing a sense of speed thereto. Consequently, the display device 1 can appropriately display the indicator needle.

The display device 1 described hereinabove further enables the controller 3 to control the display section 2 to display the indicator-needle motion-blurred images 24 in a manner such that, as a rotation amount per unit time that the indicator needle is assumed to reach when rotated increases, the length of the corresponding indicator-needle motion-blurred image 24 along the tip end of the indicator needle in the direction of the rotation on one side thereof opposite to the center of the rotation is longer. Thus, using the indicator-needle motion-blurred images 24, the display device 1 can more dynamically represents the movement of the indicator needle while providing a sense of speed thereto.

Second Embodiment

A display device according to the second embodiment employs a manner for displaying an indicator needle image that is different from the manner in the first embodiment. Hereinafter, the same reference signs are assigned to the same components as those in the above-described embodiment, and repetitive descriptions are omitted as much as possible regarding common configurations, advantages, and effects (the same applies to all of the following).

As illustrated in FIG. 1 and FIG. 7, when the indicator needle is at a start point position or an end point position at which the indicator needle is unmoving, the image generator 32 in this embodiment generates, based on image data stored in the storage unit 31, the gauge section image 22 and the indicator needle image 21 as display image data. Based on these images, the display controlling section 33 causes the display section 2 to display the gauge section image 22 and the indicator needle image 21 in respective unmoving states. In contrast, when the indicator needle is in a transitioning state where it is being rotated from a start point position to an end point position, the image generator 32 generates, as display image data for each frame, not only the gauge section image 22 and the indicator-needle motion-blurred image 24 that have been described above, but also an indicator needle image 21A obtained by deforming the indicator needle image 21 in accordance with a rotation amount per unit time, that is, a rotation speed, that the indicator needle is assumed to reach when rotated. That is, when the indicator needle is in a transitioning state where it is being rotated from a start point position to an end point position, the image generator 32 and the display controlling section 33 in this case express the movement of the indicator needle using not only the indicator-needle motion-blurred images 24, which represent afterimages of the indicator needle, but also the indicator needle image 21A itself. In this case, the image generator 32 generates the indicator needle image 21A so that the indicator needle image 21A can be positioned at a forward end of each of the indicator-needle motion-blurred images 24 in a direction in which the indicator needle rotates. The image generator 32 then generates the indicator needle image 21A in a manner such that, as a rotation amount per unit time that the indicator needle is assumed to reach when rotated increase, the length (length of an arch portion on one side opposite to the axial line X) of the indicator needle image 21A along the tip end of the indicator needle in the direction of the rotation on one side thereof opposite to the center of the rotation is longer. In this case, for example, in the processing at step ST4 described with reference to FIG. 6, the image generator 32 generates, as display image data, the gauge section image 22, the indicator-needle motion-blurred image 24 that corresponds to a rotation range per unit time from the entire indicator-needle motion-blurred image 23, and the indicator needle image 21A, based on image data stored in the storage unit 31. Based on these images, the display controlling section 33 then causes the display section 2 to dynamically display the indicator-needle motion-blurred images 24 and the indicator needle image 21A across a plurality of frames while causing the display section 2 to display the gauge section image 22 in an unmoving state. That is, the display controlling section 33 controls the display section 2 to display the indicator needle image 21A, which represents the indicator needle, at the forward end of each of the indicator-needle motion-blurred images 24 in a direction in which the indicator needle rotates. In this displaying, the display controlling section 33 controls the display section 2 to display the indicator needle image 21A in a manner such that, as a rotation amount per unit time that the indicator needle is assumed to reach when rotated increases, the length of the indicator needle image 21A along the tip end thereof in the direction of the rotation on one side thereof opposite to the center of the rotation is longer. In the example of FIG. 7, the start point position is a position at which the tip end 21a of the indicator needle image 21 representing the indicator needle faces upward in the figure, and the end point position is a position at which the tip end 21a of the indicator image 21 representing the indicator needle faces downward in the figure after rotating 180 degrees counterclockwise (to the left) about the axial line X from the start point position. It is assumed that the rotation amount per unit time (i.e., the rotation speed) of the indicator needle gradually increases starting from the start point position, is the largest at the intermediate position in the course of rotation of the indicator needle from the start point position to the end point position, and gradually decreases toward the end point portion. In accordance with this assumption, the lengths in the rotation direction (lengths of the arch portions on one side opposite to the axial line X) of the indicator-needle motion-blurred images 24 and the indicator needle image 21A are gradually longer starting from the start point position and are gradually shorter toward the end point position with the longest ones of these images found at the intermediate position in the course of rotation of the indicator needle from the start point position to the end point position.

The display device 1 described hereinabove can minimize the amount of calculation and a computational load, and additionally can dynamically represent the movement of the indicator needle while providing a sense of speed thereto, thus being capable of appropriately displaying the indicator needle.

The display device 1 according to this embodiment described hereinabove also can represent the movement of the indicator needle with an improved sense of reality because the movement of the indicator needle is expressed with not only the indicator-needle motion-blurred images 24 but also the indicator needle image 21A itself displayed when the indicator needle is in a transitioning state where it is being rotated from a start point position to an end point position.

In this case, the display device 1 according to this embodiment described hereinabove enables the controller 3 to control the display section 2 to display the indicator-needle motion-blurred images 24 and the indicator needle image 21A in a manner such that, as a rotation amount per unit time the indicator needle is assumed to reach when rotated increases, the length of the indicator-needle motion-blurred image 24 along the tip end of the indicator needle in the direction of the rotation on one side thereof opposite to the center of the rotation is longer, and the length of the indicator needle image 21A along the tip end of the indicator needle in the direction of the rotation on one side thereof opposite to the center of the rotation is longer. Thus, the display device 1 can more dynamically represent the movement of the indicator needle while providing a sense of speed thereto.

The above-described display devices according to the present embodiments are not limited by the above-described embodiments, and can be variously changed within the scope of the appended claims. Each of the display devices according to the present embodiments may be configured through appropriate combination of components in the respective embodiments and modified descriptions to the embodiments that have been described above.

The storage unit 31 described above has been described as one of the component included in the controller 3 but is not limited to this example, and may be provided as a storage unit outside of the controller 3 and separately from the controller 3.

The image generator 32 in the second embodiment described above has been described as a unit configured to, when the indicator needle is in a transitioning state where it is being rotated from a start point position to an end point position, the image generator 32 generates not only the indicator-needle motion-blurred image 24 but also the indicator needle image 21A obtained by deforming the indicator needle image 21 in accordance with a rotation amount per unit time, that is, a rotation speed, that the indicator needle is assumed to reach when rotated. This example is not limiting, and the indicator needle image 21 in an unmoving state may be employed simply. That is, the display controlling section 33 in the second embodiment may display the indicator needle image 21 in an unmoving state at the forward end of each of the indicator-needle motion-blurred images 24 in a direction in which the indicator needle rotates.

The image generator 32 in the second embodiment described above generates the indicator needle image 21A in a manner such that the length (length of an arch portion on one side opposite to the axial line X) of the indicator needle image 21A along the tip end of the indicator needle in the direction of the rotation on one side thereof opposite to the center of the rotation is longer as a rotation amount per unit time that the indicator needle is assumed to reach when rotated increases. This example, however, is not limited to the configuration as described. The image generator 32 in the second embodiment may, for example, as illustrated in FIG. 8, generate a slightly flatter teardrop-shaped indicator needle image 21B instead of the indicator needle image 21A, which is generated as a substantially sectorial image. In this case, the image generator 32 generates the indicator needle image 21B in a manner such that, as a rotation amount per unit time that the indicator needle is assumed to reach when rotated increases, the length (length of an arch portion on one side opposite to the axial line X) of the indicator needle image 21A along the tip end thereof in the direction of the rotation on one side thereof opposite to the center of the rotation is longer. Based on these images, the display controlling section 33 then causes the display section 2 to dynamically display the indicator-needle motion-blurred images 24 and the indicator needle image 21B across a plurality of frames while causing the display section 2 to display the gauge section image 22 in an unmoving state. Even in this case, the display device 1 can more dynamically represent the movement of the indicator needle while providing a sense of speed thereto.

The display device 1 described hereinabove has been described as an device applied to vehicles but is not limited to such an example, and may be applied to equipment other than vehicles.

A display device according to each of the present embodiments is effective at enabling an indicator needle to be appropriately displayed because the display device enables a controller to control a display section to display, from an entire indicator-needle motion-blurred image stored in a storage unit, an indicator-needle motion-blurred image representing an afterimage of an indicator needle, the afterimage corresponding to a rotation range within which the indicator needle rotates per unit time when rotated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A display device comprising:
a display configured to display an image;
a storage storing an entire indicator-needle motion-blurred image that represents an afterimage corresponding to an entire rotation range within which an indicator needle is capable of rotating, and that is an image continuous in a circumferential direction thereof; and
a controller configured to control the display to display an indicator-needle motion-blurred image that is a portion of the entire indicator-needle motion-blurred image, wherein the indicator-needle motion-blurred image represents an afterimage of the indicator needle that corresponds to a rotation range within which the indicator needle rotates per unit time when rotated,.
wherein the controller is further configured to:
control the display to display an indicator needle image at a forward end of the indicator-needle motion-blurred image in a direction of rotating of the indicator needle, the indicator needle image representing the indicator needle, and
control the display to display the indicator-needle motion-blurred image and the indicator needle image such that, as a rotation amount per the unit time that the indicator needle reaches when rotated increases, a length of the indicator-needle motion-blurred image along a tip end of the indicator needle and a length of the indicator needle image along the tip end of the indicator needle are longer than respective lengths of the indicator-needle motion-blurred image along a base end of the indicator needle and the indicator-needle motion-blurred image along a base end of the indicator needle.

2. The display device according to claim 1, wherein the display device is mounted on an instrument panel installed in a vehicle, and the display device displays vehicle information.

3. A display device comprising:
a display configured to display an image; and
a controller configured to control the display to display an indicator-needle motion-blurred image from an entire indicator-needle motion-blurred image that is an image previously stored in a storage and represents an afterimage corresponding to an entire rotation range within which an indicator needle is capable of rotating and that is an image continuous in a circumferential direction thereof, the indicator-needle motion-blurred image representing an afterimage of the indicator needle that corresponds to a rotation range within which the indicator needle rotates per unit time when rotated,
wherein the controller generates the indicator-needle motion-blurred image by cutting out a range corresponding to the rotation range per unit time from the entire indicator-needle motion-blurred image stored in the storage, or by generating an image having a mask image of a background color superimposed on the entire indicator-needle motion-blurred image stored in the storage and removing a range of the mask image corresponding to the rotation range per unit time
wherein the controller is further configured to:
control the display to display an indicator needle image at a forward end of the indicator-needle motion-blurred image in a direction of rotating of the indicator needle, the indicator needle image representing the indicator needle, and
control the display to display the indicator-needle motion-blurred image and the indicator needle image such that, as a rotation amount per the unit time that the indicator needle reaches when rotated increases, a length of the indicator-needle motion-blurred image along a tip end of the indicator needle and a length of the indicator needle image along the tip end of the indicator needle are longer than respective lengths of the indicator-needle motion-blurred image along a base end of the indicator needle and the indicator-needle motion-blurred image along a base end of the indicator needle.

4. The display device according to claim 1, wherein
the controller is configured to generate a sectorial indicator-needle motion-blurred image that is the portion of the entire indicator-needle motion-blurred image from the entire indicator-needle motion-blurred image, and
the sectorial indicator-needle motion-blurred image represents the afterimage of the indicator needle that corresponds to the rotation range within which the indicator needle rotates per unit time when rotated.

5. The display device according to claim 3, wherein
the indicator-needle motion-blurred image is a sectorial image, and
the controller generates the indicator-needle motion-blurred image that is the sectorial image by cutting out the range corresponding to the rotation range per unit time from the entire indicator-needle motion-blurred image stored in the storage, or by generating the image having the mask image of the background color superimposed on the entire indicator-needle motion-blurred image stored in the storage and removing the range of the mask image corresponding to the rotation range per unit time.

6. The display device according to claim 1, wherein the entire indicator-needle motion-blurred image has a shape of a circle.

* * * * *